SUPERCONDUCTING COMPOSITIONS
Filed Feb. 19, 1963
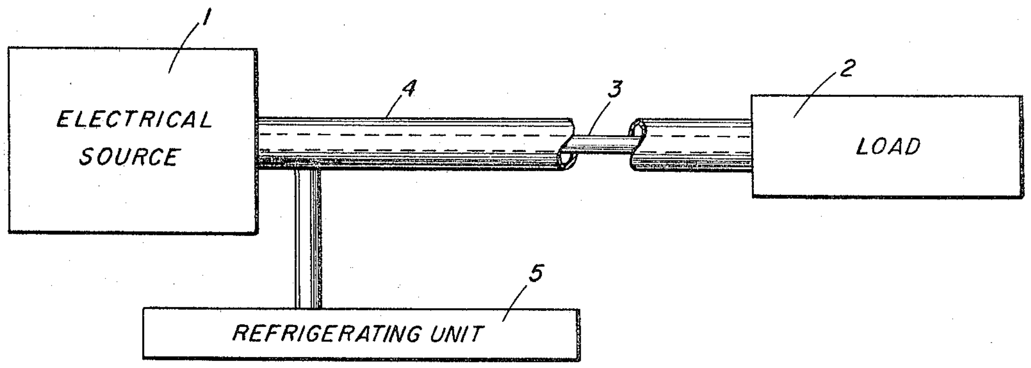
INVENTOR.
FRITZ HULLIGER
BY John E. Hamedan
ATTORNEY

United States Patent Office 3,295,931

Patented Jan. 3, 1967

3,295,931

SUPERCONDUCTING COMPOSITIONS

Fritz Hulliger, Uerikon, Zurich, Switzerland, assignor to American Cyanamid Company, Stamford, Conn., a corporation of Maine

Filed Feb. 19, 1963, Ser. No. 259,649

7 Claims. (Cl. 23—315)

The present invention relates to superconducting compounds and to electrical systems employing them.

The term superconduction is applied to the phenomenon of exceedingly low electrical resistance which certain substances exhibit at low temperatures. The electrical resistance of materials in their superconducting state may be so low as to permit long distance phone conversations over telephones connected together only by superconducting wires, without the assistance of amplifiers now employed to overcome the resistance in conventional circuits.

Among the problems associated with advancing the state of the superconducting art is the limited number of superconductor materials that are available for employment in devices adapted to their use.

Accordingly it is an object of the present invention to provide a novel group of superconducting ternary compounds.

It is a further object of this invention to provide an electrical transmission system employing the novel superconductors of this invention.

These and other objects and advantages of the present invention will become more apparent from the detailed description thereof set forth hereinbelow in conjunction with the accompanying drawing, the single figure of which is a schematic diagram of an electrical system employing a superconducting transmission line.

According to the present invention, novel intermetallic transition element ternary compounds are provided of the formula

XYZ where X is a member selected from the group consisting of Pd and Pt, Y is a member selected from the group consisting of Sb and Bi, and Z is a member selected from the group consisting of Se and Te.

Among the superconducting compounds of the class exemplified by the above formula, the following are illustrative: PdSbSe, PdSbTe, PdBiSe, PdBiTe, and PtBiSe.

The superconducting ternary compounds of this invention were prepared by intimately mixing the powdered component elements and pressing them into pellets of 8 millimeters in diameter by applying a pressure of about 5 tons. These pellets were then slowly heated in exacuated sealed quartz tubes at temperatures up to 500° C. for as long as one to two months. This technique was sufficient to obtain homogeneous samples in the form of gray dense pellets.

Employing this procedure, the following compounds were prepared and their lattice constants and transition temperatures were measured.

SUPERCONDUCTING COMPOUNDS

| Compound | Transition Temperature (° K.) | Lattice Constant (A.) |
|---|---|---|
| PdSbSe | 1.0 (extrapolated) | 6.323 |
| PbBiSe | 1.0 (extrapolated) | 6.432 |
| PdSbTe | 1.2 | 6.533 |
| PbBiTe | 1.2 | 6.656 |
| PtBiSe | 1.45 | 6.42 |
| PtBiTe | 1.15 | 6.59 |

The lattice constants recorded in the table above were obtained by X-ray analyses which were carried out on a Siemens Kristalloflex 4 with a goniometer.

The transition temperatures were obtained by measuring the magnetic induction as a function of temperature down to 1.1° K.

The transition temperature of these ternary compounds may be affected by departures from exact stoichiometric conditions, as well as by impurities. Deviation from stoichiometry may rise or lower the transition temperature. The same is true for a partial replacement of atoms by chemically like atoms. In addition, the superconductors of this invention may be employed in combination with other known superconducting materials.

To illustrate the use of the conductors of this invention in an electrical transmission system, reference is had to the accompanying drawing, in which an electrical source 1 is coupled to a load 2 by means of a superconducting transmission line 3 illustratively composed of the conductors of this invention. Enclosing the transmission line 3 is a cooling jacket 4 which is cooled by means of a refrigerating unit 5. This refrigerating unit is to maintain the superconducting material 3 below its transition temperature.

It is to be understood that the above-described arrangement is illustrative of a use of the conductors of this invention. Numerous other variations and modifications of the concepts disclosed and claimed herein may be devised by those skilled in the art without departing from the spirit and scope of this invention.

I claim:

1. A homogeneous superconductor composition having the formula

XYZ where X is a member selected from the group consisting of Pd and Pt, Y is a member selected from the group consisting of Sb and Bi, and Z is a member selected from the group consisting of Se and Te said composition having been prepared by intimately mixing powdered component elements, molding said mixtures under pressure and heating them, said pressure of molding and time and temperature of heating being such as to form said homogeneous superconducting composition.

2. A homogeneous superconductor composition of the formula

PdSbSe said composition having been prepared by intimately mixing the powdered component elements, molding said mixtures under pressure and heating them, said pressure of molding and time and temperature of heating being such as to form said homogeneous superconducting composition.

3. A homogeneous superconductor composition of the formula

PdBiSe said composition having been prepared by intimately mixing the powdered component elements, molding said mixtures under pressure and heating them, said pressure of molding and time and temperature of heating being such as to form said homogeneous superconducting composition.

4. A homogeneous superconductor composition of the formula

PdSbTe said composition having been prepared by intimately mixing the powdered component elements, molding said mixtures under pressure and heating them, said pressure of molding and time and temperature of heating being such as to form said homogeneous superconducting composition.

5. A homogeneous superconductor composition of the formula

PbBiTe said composition having been prepared by intimately mixing the powdered component elements, molding said mixtures under pressure and heating them, said pressure of molding and time and temperature of heating being such as to form said homogeneous superconducting composition.

6. A homogeneous superconductor composition of the formula

PtBiSe said composition having been prepared by intimately mixing the powdered component elements, molding said mixtures under pressure and heating them, said pressure of molding and time and temperature of heating being such as to form said homogeneous superconducting composition.

7. A homogeneous superconductor composition of the formula

PtBiTe said composition having been prepared by intimately mixing the powdered component elements, molding said mixtures under pressure and heating them, said pressure of molding and time and temperature of heating being such as to form said homogeneous superconducting composition.

References Cited by the Examiner

UNITED STATES PATENTS

| | | | |
|---|---|---|---|
| 2,857,268 | 10/1958 | Cleary | 75—134 |
| 2,866,842 | 12/1958 | Matthias | 174—15 |
| 2,882,467 | 4/1959 | Wernick. | |
| 2,882,468 | 4/1959 | Wernick. | |
| 3,023,080 | 2/1962 | Kulifay | 23—50 |
| 3,102,973 | 9/1963 | Kunzler | 317—158 |

OTHER REFERENCES

Kulifay (II), Journal of the American Chemical Society, vol. 83, pp. 4916, 4919 (1961).

Sinani et al., "Solid Solutions of $Bi_2Se$ and $Bi_2Te$ as Material for Thermoelectrics," Zhurnal Tekhnicheskoy Fiziki, vol. XXVI, No. 10, pp. 2398–2399.

Burton, Superconductivity, 1934, p. 54.

LARAMIE E. ASKIN, *Primary Examiner.*

S. DAVID, D. L. CLAY, *Assistant Examiners.*